United States Patent Office 3,455,743
Patented July 15, 1969

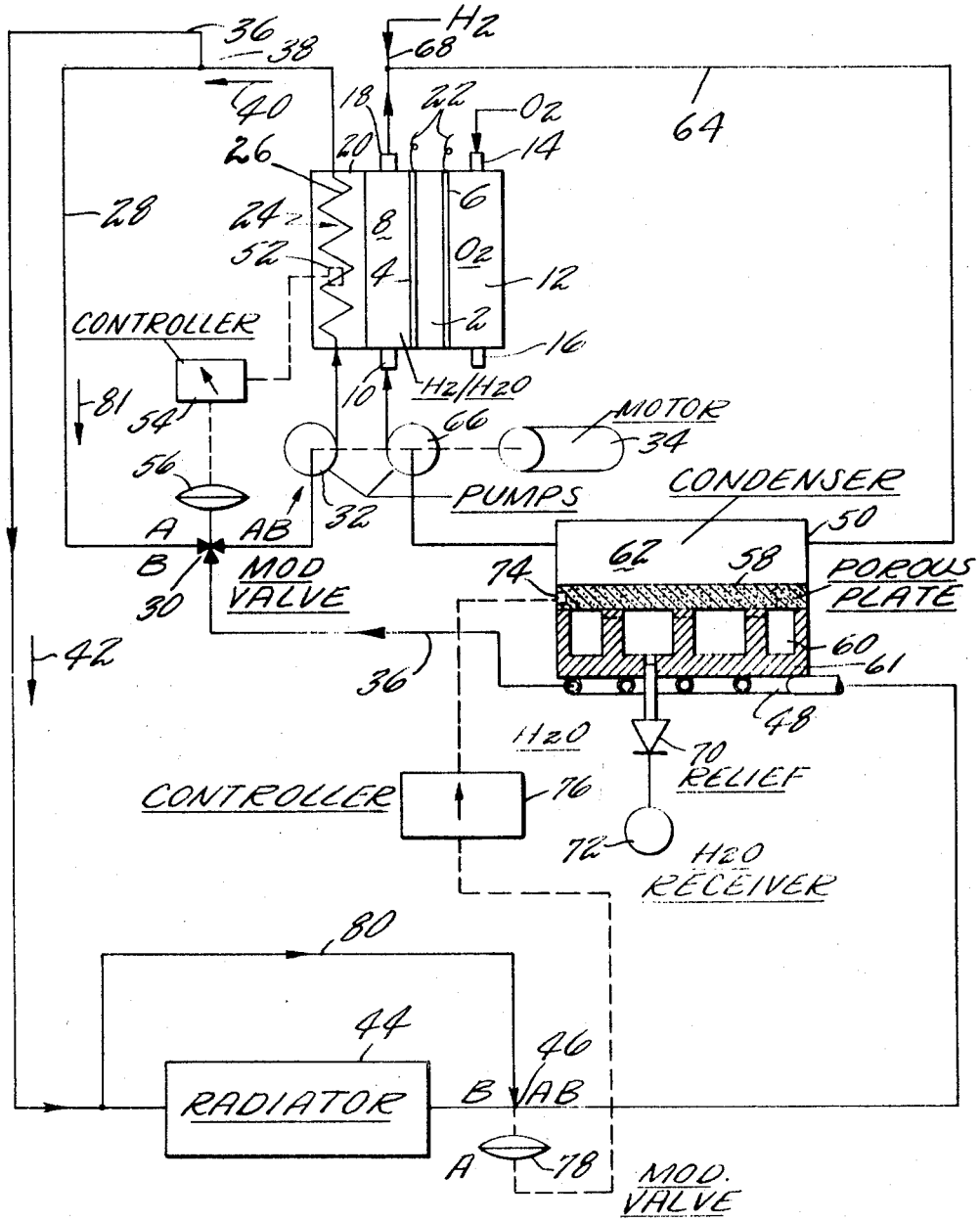

3,455,743
FUEL CELL WITH HEAT AND WATER
VAPOR REMOVING MEANS
Richard G. Huebscher, Mayfield Village, and Thomas H.
Hacha, Willoughby, Ohio, assignors, by mesne assignments, to United Aircraft Corporation, East Hartford,
Conn., a corporation of Delaware
Filed Feb. 1, 1966, Ser. No. 524,275
Int. Cl. H01m 27/12
U.S. Cl. 136—86                                 6 Claims This invention relates to a system for controlling the output of a fuel cell and more particularly to a system for the removal of heat and water vapor from a cell during cell operation.

One feature of the invention is the use of a heat removal system that functions independently of the humidity removal system. Another feature is the removal of water by the circulation of an excess of hydrogen in which the vapor removal is proportional to the temperature rise in the electrolyte.

A primary feature of the system is its ability to maintain the electrolyte volume within the cell between close limits in order to prevent cell drying or cell flooding with consequent degradation in electrical performance. Cell flooding may result in loss of electrolyte from the battery to external plumbing and cell drying may result in internal mixing of the hydrogen and oxygen gases which in the presence of the electrode may result in cell destruction by burning.

One particular feature is the so-called loop system in which the coolant for the cell is circulated through a circuit that cooperates with the hydrogen circulating circuit but in which there is no fluid flow between the two circuits.

Other features and advantages will be apparent from the specification and claims, and from the accompanying drawing which illustrates an embodiment of the invention.

The single figure is a schematic view of the system.

The invention is intended for a hydrogen-oxygen cell in which hydrogen as the fuel and oxygen combine to form water and in so doing produce usable electricity. This cell may be the "Bacon-type" cell, using porous nickel electrodes and with a trapped electrolyte. That is to say, the electrolyte is located between the two electrodes and is not circulated into and out of the cell.

Referring to the drawing, a single hydrogen-oxygen cell is shown, having a trapped electrolyte 2 located between electrodes 4 and 6. The hydrogen electrode 4 is located between the electrolyte and a hydrogen chamber 8 into which hydrogen gas is delivered through an inlet 10. The oxygen electrode 6 is located between the electrolyte and a chamber 12 into which oxygen is delivered under pressure through an inlet 14. Excess oxygen escapes through an outlet 16 and excess hydrogen and water vapor escapes through an outlet 18.

The cell is located in an enclosing housing 20 which may be of insulating material so that the electrodes are insulated from one another and electricity is delivered to leads 22. Within the housing and adjacent to the wall of hydrogen chamber 8 is a cold plate 24 by which heat removal from the cell is effected. This plate has a coolant passage 26 therein connected into an auxiliary coolant circuit 28 which includes a modulating valve 30 and a circulating pump 32, the latter circulating the coolant through the circuit. A motor 34 drives the pump preferably at a constant speed during cell operation.

Associated with the auxiliary cooling circuit or conduit 28 is a cooperating main cooling circuit 36 that taps into circuit 28 at a connection 38 downstream of the outlet for the cooling fluid from the cell (the flow being in the direction of the arrow 40). From the connection 38 coolant flows through circuit 36 in the direction of arrow 42 to a radiator 44 and thence past a modulating valve 46 and through a coil 48 associated with a condenser 50 to the modulating valve 30. This valve is temperature responsive being actuated from a temperature sensing element 52 preferably located adjacent to the cold plate 24. The sensed temperature operates through a controller 54 to an actuator 56 for the valve, thereby moving the valve 30 to control the quantity of coolant entering the auxiliary circuit 28 from the main circuit, the arrangement being designed to maintain a constant temperature at the sensor 52 by increasing the flow from circuit 36 if the coolant temperature begins to increase. The collant entering valve 30 from circuit 36 is cooler than the coolant in the auxiliary circuit 28, as will become apparent.

The condenser 50 is a porous plate condenser in which a porous plate 58 forms the dividing wall between two chambers 60 and 62. The chamber 60 which is defined by a ribbed plate 61, as shown, is filled with water and is cooled by the coil 48. The chamber 62 receives hydrogen gas and water vapor from the fuel cell through the circuit 64 from the hydrogen outlet 18 through the condenser to a pump 66 and thence to the hydrogen inlet 10. Additional hydrogen is added to the circuit adjacent the outlet 18 through a supply connection 68.

The porous plate 58 is kept cool by the water in compartment 60 and by the contact with the ribs on the plate 61. The plate 58 condenses water from the hydrogen and water vapor in chamber 62 onto the exposed surface of the plate. The gas pressure in chamber 62 forces the water through the plate as it is formed but the surface tension of the water prevents the escape of gas through the plate. The condensed water escapes through a relief valve 70 into a container 72. The relief valve 70 is set to maintain a pressure in compartment 60 that will permit water to flow through the porous plate but will prevent the flow of gas therethrough. This arrangement will work in a zero gravity environment since the condensed water is all on the plate surface and is forced through the plate by gas pressure.

The temperature of the porous plate is maintained constant by a temperature sensing device 74 on the plate which conveys a temperature signal to a controller 76 which in turn activates a valve actuator 78 for valve 46. This valve serves to mix cooled coolant from the radiator with uncooled coolant flowing around the radiator through a bypass conduit 80 and thereby maintains a substantially constant temperature at plate 58. Obviously, if the plate temperature at 74 increases, the valve 46 will be moved to increase the proportion of coolant from the radiator flowing through the valve thus serving to lower the coolant temperature in chamber 60 and lowering the plate temperature.

In operation, the pressures of the hydrogen and oxygen entering the cell are controlled in a well-known manner. With motor 34 operating, hydrogen is forced into the chamber 8 and flows therethrough in the same direction as the coolant in plate 24. A part of the hydrogen and oxygen gases flowing through the pores of the electrodes produces electricity with a resultant increase in temperature of the cell until design temperature is reached.

Assume the hydrogen and oxygen inlet pressures are 65 p.s.i. and the nominal operating cell temperature is 182° F. Due to the large heat transfer area and low thermal resistance between the coolant in passage 26, the adjacent plate 24, the electrode 4, and the electrolyte 2, coolant and electrolyte temperature are nearly identical. Assume the temperature of the coolant entering the cell is 170° F. and thus, by the above statement, the electrolyte temperature at the inlet to the cell is nearly 170° F. Assume also that the saturation temperature of the hydrogen-water vapor mixture leaving the condenser and entering the cell is 150° F. The above combination of electrolyte temperature and hydrogen saturation temperature specifies a given electrolyte concentration and volume. As the coolant passes through the cell it picks up heat and may leave the cell at 195° F. Thus the electrolyte temperature at the outlet end of the cell is very near 195° F. If the ratio of hydrogen to coolant mass rates are properly specified in design, the vapor pressure of the water in the hydrogen stream at the outlet of the cell is at a saturation temperature of 175° F. With both coolant and hydrogen flowing in the same direction, the differential between the coolant temperature and the saturation temperature of the hydrogen remains essentially constant and specifies constant electrolyte concentration and volume as well as constant water removal rate from the inlet end to the outlet end of the cell.

The condenser, which receives hydrogen and water vapor at a saturation temperature of 175° F., condenses out the water vapor and cools the hydrogen to a saturation temperature of 150° F. The drop in pressure in hydrogen circuit 64 is made up by the pump 66.

The coolant leaving the cell is, in part, circulated through the radiator 44 which drops the temperature to 70° F. or ambient, in part through the auxiliary coolant circuit 28 in the direction of the arrow 81, and in part around the radiator through bypass 80 as determined by valves 30 and 46 such that the inlet temperature of the coolant entering the condenser is 120° F. The coolant leaving the condenser may be at 145° F. and is mixed with the coolant in circuit 28 at valve 30 so that the coolant entering the cold plate is again 170° F.

Although specific operating temperatures have been given, it is understood that this is merely exemplary since the fuel cell used may be a higher or lower pressure or higher or lower temperature cell in which event the temperatures and pressures of the system will be adjusted accordingly. The temperature sensing devices are well-known commercially available devices as are the controllers and modulating valves and the actuators for the valves.

Obviously, as the hydrogen gas is circulated through the cell, it will pick up water vapor in proportion to the temperature rise of the electrolyte as established by the temperature rise of the coolant.

The hydrogen circuit thus functions primarily for picking up water vapor from the cell and delivering it to the condenser and is not utilized primarily for maintaining cell temperature. The coolant circuit is independent of the hydrogen circuit and thus may utilize a more effective coolant than hydrogen and by appropriate flow will provide most efficient heat removal from the cell. This system avoids the need for a circulating electrolyte.

This system possesses the capability of maintaining electrolyte volume constant with changes in electrical load on the fuel cell. Under condition of a load increase on the cell, both the leaving coolant temperature and the leaving saturation temperature of the hydrogen will increase by the same increment. Thus the difference between these quantities remains unchanged and consequently the electrolyte volume remains constant as required by a capillary cell.

It is to be understood that the invention is not limited to the specific embodiment herein illustrated and described, but may be used in other ways without departure from its spirit as defined by the following claims.

The embodiments of the invention in which an exclusive property or privilege is claimed are defined as follows:

1. The combination with a hydrogen-oxygen fuel cell having a hydrogen compartment through which hydrogen gas is circulated, and from which hydrogen enters the cell, and a cooling plate forming one wall of the compartment, of means for cooling said plate comprising a coolant circuit including said plate, a pump in said circuit for circulating the coolant, a radiator in the circuit for cooling the coolant, and a condenser in said circuit downstream of said radiator, a portion of said coolant circuit being in heat exchange relationship with said condenser, means for circulating an excess of hydrogen gas through said compartment and recycling the hydrogen to said compartment, said means including a hydrogen circuit, a pump in the hydrogen circuit for circulating the excess hydrogen and said condenser also in said hydrogen circuit, said condenser serving to condense water vapor in the excess hydrogen gas.

2. The combination as in claim 1 in which the condenser includes as one wall a porous plate through which the condensed water passes, and a receiver for the water.

3. The combination as in claim 1 in which a temperature responsive control adjusts the flow of coolant in the cell coolant circuit.

4. The combination with a fuel cell having a hydrogen electrode and an oxygen electrode, an electrolyte between the electrodes and a compartment on the side of each electrode opposite to the electrolyte to receive hydrogen or oxygen gas therein, a cooling plate forming the outer wall of the hydrogen compartment and a cooling passage through said plate, of a coolant circuit for coolant including the cooling passage, a radiator, a condenser, a mixing valve and a pump, with the coolant flowing through these elements in that order, a second coolant circuit directly from the cooling passage to the mixing valve, temperature responsive means within the cooling passage, and means actuated by said temperature responsive means to operate said mixing valve to maintain the desired temperature within the cooling passage.

5. The combination as in claim 4 in which the condenser includes a porous plate, and means are provided by which the hydrogen is circulated from the cell through the condenser for causing water vapor in the hydrogen gas to be condensed by the porous plate, the latter being cooled by the coolant from the radiator.

6. The combination as in claim 5 in which a temperature sensing means is associated with the porous plate, the radiator has a bypass around it with a modulating valve controlling the flow of coolant around the radiator, and with means responsive to said temperature sensing means for actuating said modulating valve.

References Cited
UNITED STATES PATENTS

| | | | |
|---|---|---|---|
| 3,061,658 | 10/1962 | Blackmer | 136—86 |
| 3,172,784 | 3/1965 | Blackmer | 136—86 |
| 3,198,664 | 8/1965 | Kunz | 136—86 |
| 3,253,957 | 5/1966 | Turner et al. | 136—86 |
| 3,370,984 | 2/1968 | Platner | 136—86 |
| 3,379,572 | 4/1968 | Gay | 136—86 |

ALLEN B. CURTIS, Primary Examiner

U.S. Cl. X.R.

165—186